F. X. Monnier.
Fishing-Line.
№ 87,188. Patented Feb. 23, 1869.
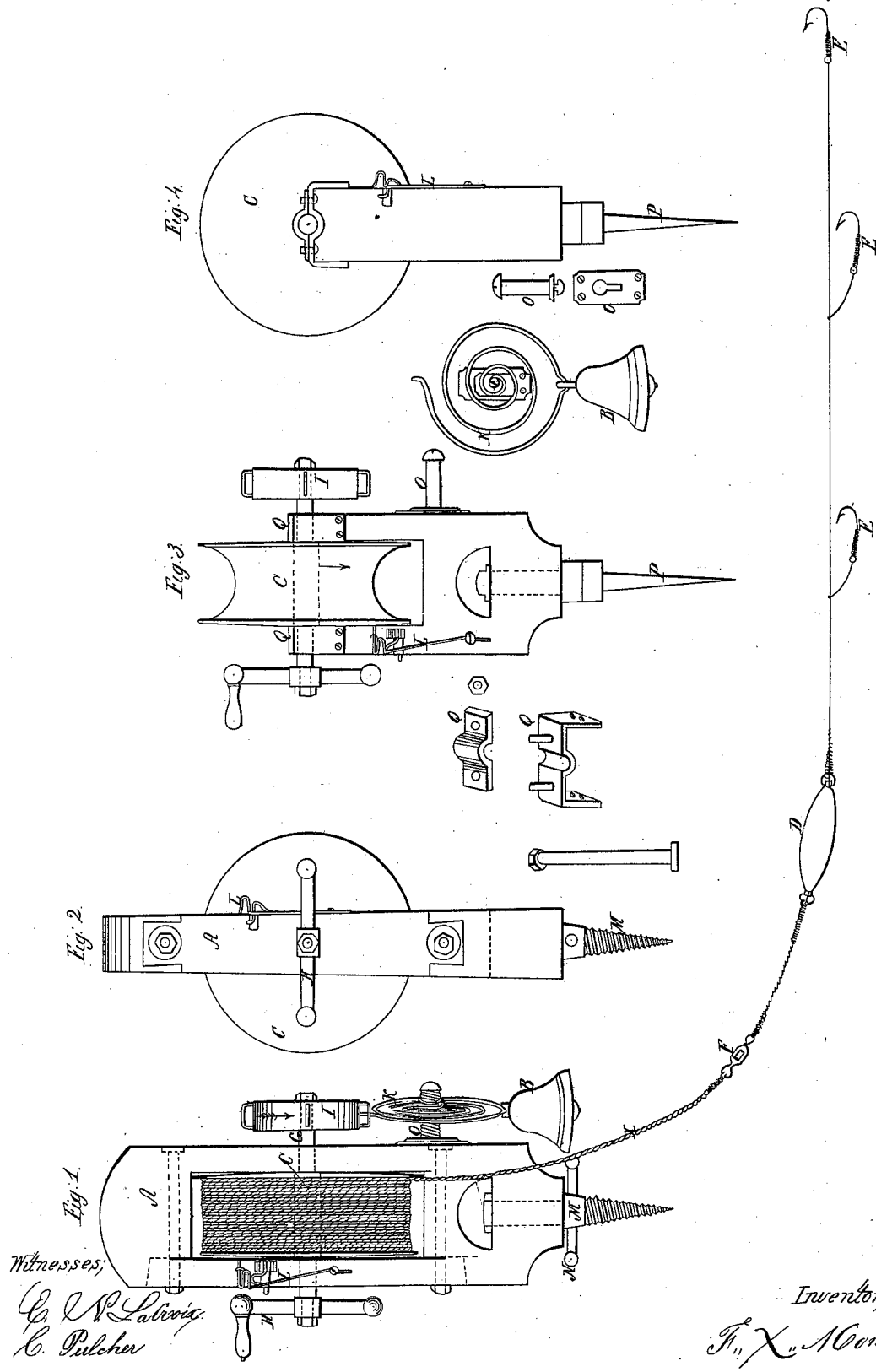
Witnesses:
Inventor,
F. X. Monnier

FRANCIS XAVIER MONNIER, OF DETROIT, MICHIGAN.

Letters Patent No. 87,188, dated February 23, 1869.

PIVOT FISHING-LINE.

The Schedule referred to in these Letters Patent and making part of the same.

*To all whom it may concern:*

Be it known that I, FRANCIS XAVIER MONNIER, of Detroit, in the county of Wayne, in the State of Michigan, have invented a new and improved Pivot Fishing-Line; and I do hereby declare that the following is a full and exact description thereof, reference being had to the accompanying drawings, and to the letters of reference marked thereon.

The nature of my invention consists in a new apparatus for fishing, without the use of a pole, and its connection with a bell, B, to warn when a fish is taken.

Figure 1 is an elevation and front view of the pivot fishing-line.

Figure 2 is a side view of fig. 1.

Figure 3 is an elevation and front view of another form of pivot fishing-line.

Figure 4 is a side view of fig. 3.

To enable others skilled in the art to make and use my invention, I will proceed to describe its construction and operation.

Figure 1 is a front view.

A is a frame, in which turns freely the bobbin C, shown loaded with a fishing-line, having, at its extremity, a lead, D, and fish-hooks E E E.

At F is an articulated joint, to prevent the twisting of the line.

On the axle G, of the bobbin C, there is, on one side, a crank, H, to wind up the fishing-line; on the other side is a notched wheel, I.

In turning, the notches J catch the spiral spring $k$, of the bell B, and cause it to ring.

On the frame there is a spring-trigger, L, which, when set free, catches on the bobbin C, and prevents it from turning.

In this figure, the trigger is fixed so that the bobbin can turn freely.

At the bottom of the frame there is a pointed screw, which turns freely in it by means of the short bar N, affixed to the screw at right angles. The latter is adapted to be secured to a wharf, or other fixture.

The frame, thus firmly fixed to the shore, can, nevertheless, turn freely on its pivot, in the direction given by the fish pulling up or down the current of the river.

The bell B is fastened to the frame by means of a spring-bolt, O, of which the details are shown in fig. 4. It can be taken out in order to carry about the pivot-line, or during the operation of putting the line in fishing-place.

In fig. 2 the same pieces are shown as in fig. 1.

Fig. 3 is another pivot-line, of a different form, of which the extremity, instead of being a screw, ends by a sharp point, to drive in the ground.

Q Q are details of the bearings of the bobbin without the fishing-line, in order to show it better.

Fig. 4 is a side view of fig. 3.

We will now proceed to show how to use the apparatus.

The pivot-line being at first fixed to the shore, and the hooks being provided with bait, enough of the line is unrolled to let it reach the bottom; then, by means of the crank H, enough of it is rolled back on the bobbin C to produce a gentle tension of the line. The bell B is then put in its place.

As soon as a fish is fastened it pulls the line, which makes the bobbin C revolve, and the notches of the wheel I, touching the bell's spring, make it ring, and so warn the fisherman.

The wheel I, in catching the bell B, offers a certain resistance, which prevents it from unrolling too fast, and, by that friction, a tension is produced, sufficient to drown the fish. The fish being taken out, a new bait is put on, and fishing goes on as before.

What I claim as my invention, and desire to secure by Letters Patent, is—

1. The application of a movable bell, B, to the pivot-line frame A.

2. The pivot-line frame, constructed as described, of the slotted block A, bobbin C, crank-axle G H, carrying the ratchet-wheel I, the spring-trigger L, swivelled screw, or pin M, the spring K, and the bell B, removably attached to the block by the spring-bolt O, all arranged and operating as described, for the purpose specified.

F. X. MONNIER.

Witnesses:
 E. N. LA CROIX,
 C. PULCHER.